United States Patent
Gniadek

(10) Patent No.: US 9,188,747 B2
(45) Date of Patent: Nov. 17, 2015

(54) TRUE ONE PIECE HOUSING FIBER OPTIC ADAPTER

(71) Applicant: SENKO ADVANCED COMPONENTS, INC., Marlboro, MA (US)

(72) Inventor: Jeffrey Gniadek, Northbridge, MA (US)

(73) Assignee: Senko Advanced Components, Inc., Marlboro, MA (US)

( * ) Notice: Subject to any disclaimer, the term of this patent is extended or adjusted under 35 U.S.C. 154(b) by 78 days.

(21) Appl. No.: 14/034,506

(22) Filed: Sep. 23, 2013

(65) Prior Publication Data

US 2014/0023322 A1     Jan. 23, 2014

Related U.S. Application Data

(63) Continuation-in-part of application No. 13/113,635, filed on May 23, 2011, now abandoned.

(51) Int. Cl.
  *G02B 6/38* (2006.01)
(52) U.S. Cl.
  CPC ............... *G02B 6/38* (2013.01); *G02B 6/3825* (2013.01); *G02B 6/3897* (2013.01); *G02B 6/3893* (2013.01)

(58) Field of Classification Search
  None
  See application file for complete search history.

(56) References Cited

U.S. PATENT DOCUMENTS

| | | |
|---|---|---|
| 4,150,790 A | 4/1979 | Potter |
| 4,327,964 A | 5/1982 | Haesly et al. |
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 5,037,175 A | 8/1991 | Weber |
| D323,143 S | 1/1992 | Ohkura et al. |
| 5,212,752 A | 5/1993 | Stephenson et al. |
| 5,317,663 A * | 5/1994 | Beard et al. ............... 385/70 |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,542,015 A | 7/1996 | Hultermans |
| 5,570,445 A | 10/1996 | Chou et al. |
| 5,588,079 A | 12/1996 | Tanabe et al. |
| 5,684,903 A | 11/1997 | Kyomasu et al. |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

"Fiber Optic Connectors and Assemblies Catalog" 2009, Huber & Suhner Fiber Optics, Herisau, Switzerland, http://www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZvcvTujWH4ntrAfH-dXZCg&usg=AFQjCNE1MdC-4avewRJU6IDVc_WYbr0QQ.

(Continued)

*Primary Examiner* — Sung Pak
(74) *Attorney, Agent, or Firm* — Pepper Hamilton LLP

(57) ABSTRACT

A fiber optic adapter includes a one piece housing, and the exterior of the housing includes at least one latch for retaining the housing in a panel opening, and at least one projecting wing for reducing play between the housing and the sides of the panel opening into which the adapter may be installed.

16 Claims, 7 Drawing Sheets

(56) References Cited

U.S. PATENT DOCUMENTS

| | | |
|---|---|---|
| 5,687,268 A | 11/1997 | Stephenson et al. |
| 5,710,851 A | 1/1998 | Walter et al. |
| 5,764,834 A | 6/1998 | Hultermans |
| 5,781,681 A | 7/1998 | Manning |
| 5,867,620 A | 2/1999 | Bunin et al. |
| 5,890,926 A | 4/1999 | Pauza et al. |
| 5,923,803 A | 7/1999 | Bunin et al. |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,390,687 B1 | 5/2002 | Shirakawa |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,885,805 B2 | 4/2005 | Asada |
| 6,935,789 B2 | 8/2005 | Gross, III et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,093,983 B2 | 8/2006 | Taira et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 * | 6/2012 | Hsu et al. .................. 385/55 |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,651,749 B2 | 2/2014 | Dainese Junior et al. |
| 8,727,634 B2 | 5/2014 | Sasaki et al. |
| 2002/0079697 A1 | 6/2002 | Griffioen et al. |
| 2003/0053787 A1 | 3/2003 | Lee |
| 2003/0068135 A1 | 4/2003 | Watanabe et al. |
| 2004/0052473 A1 | 3/2004 | Seo et al. |
| 2004/0120656 A1 | 6/2004 | Banas et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2005/0196106 A1 | 9/2005 | Taira et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 * | 1/2009 | Jones et al. .................. 385/56 |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2010/0014815 A1 | 1/2010 | Ohmura et al. |
| 2010/0034502 A1 | 2/2010 | Lu et al. |
| 2010/0092136 A1 | 4/2010 | Nhep |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0141071 A1 | 6/2012 | Duis et al. |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2012/0328244 A1 | 12/2012 | Sasaki et al. |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121645 A1 | 5/2013 | Haley et al. |
| 2013/0121653 A1 | 5/2013 | Shitama et al. |
| 2013/0183012 A1 | 7/2013 | Cabanne Lopez et al. |
| 2014/0016901 A1 * | 1/2014 | Lambourn et al. .............. 385/75 |
| 2014/0050446 A1 | 2/2014 | Chang |
| 2014/0133808 A1 | 5/2014 | Hill et al. |
| 2014/0169743 A1 | 6/2014 | Hodge et al. |
| 2014/0241671 A1 | 8/2014 | Koreeda et al. |
| 2014/0334780 A1 | 11/2014 | Nguyen et al. |
| 2014/0348477 A1 | 11/2014 | Chang |

FOREIGN PATENT DOCUMENTS

| | | |
|---|---|---|
| CN | 201383588 Y | 1/2010 |
| CN | 202600189 U | 12/2013 |
| DE | 202006011910 U1 | 3/2007 |
| DE | 102006019335 A1 | 10/2007 |
| DE | 102013102886 A1 | 9/2014 |
| EP | 1072915 A2 | 1/2001 |

(56) References Cited

FOREIGN PATENT DOCUMENTS

| | | |
|---|---|---|
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009/229545 A | 10/2009 |
| JP | 2009/276493 A | 11/2009 |
| TW | 200821653 A | 5/2008 |
| WO | WO 01/79904 A2 | 10/2001 |
| WO | WO 2004/027485 A1 | 4/2004 |
| WO | WO 2008/112986 A1 | 9/2008 |
| WO | WO 2009/135787 A1 | 11/2009 |
| WO | WO 2010/024851 A2 | 3/2010 |
| WO | WO 2012/136702 A1 | 10/2012 |
| WO | WO 2012/162385 A1 | 11/2012 |
| WO | WO 2013/052070 A1 | 4/2013 |
| WO | WO 2014/028527 A2 | 2/2014 |
| WO | WO 2014/182351 A1 | 11/2014 |

OTHER PUBLICATIONS

"Fiber Optic Interconnect Solutions, Tactical Fiber Optic Connectors, Cables and Termini" 2006, Glenair, Inc., Glendale, California, http://www.mps-electronics.de/fileadmin/files/MPS-E/Produkte/Katalog/Glenair/KatalogGlenair-LWL1110.pdf.

"Fiber Optic Products Catalog" Nov. 2007, Tyco Electronics Corporation, Harrisburg, Pennsylvania, http://www.ampnetconnect.com/documents/Fiber%20Optics%20Catalog%201107.pdf.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

International Search Report and Written Opinion dated Aug. 29, 2014 for PCT/US2014/041500.

International Search Report and Written Opinion dated May 14, 2014 for PCT/US2014/012137.

International Search Report and Written Opinion dated Aug. 21, 2008 for PCT/US2008/057023.

European Search Report and Written Opinion dated Mar. 3, 2015 for EP 14187661.

European Search Report and Written Opinion dated Feb. 19, 2015 for EP 14168005.

\* cited by examiner

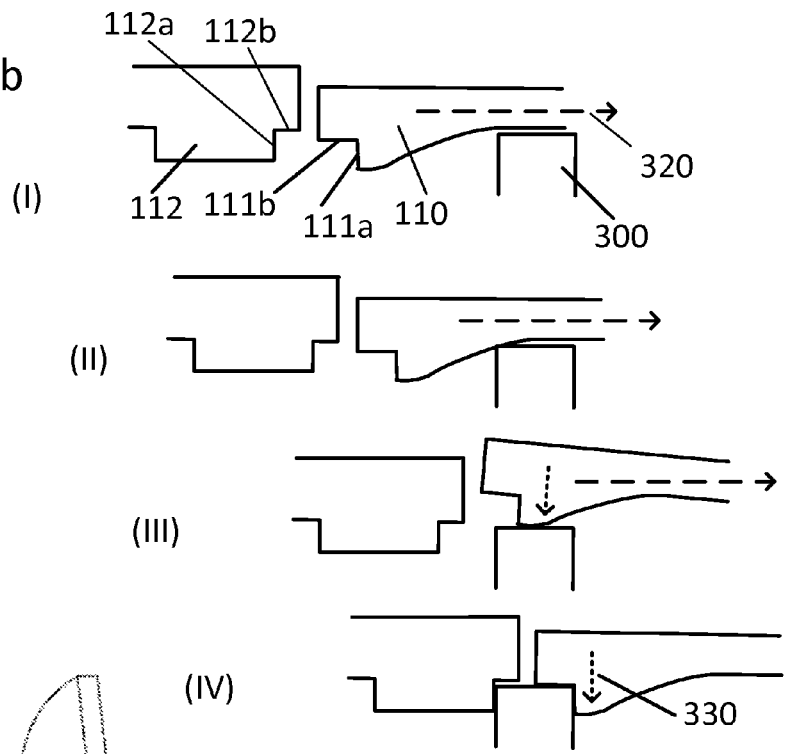
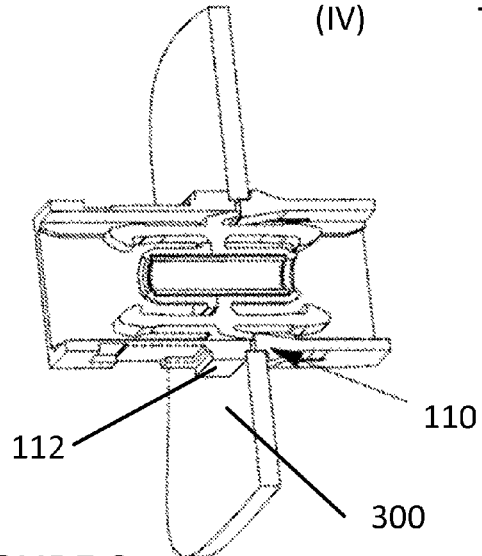
FIGURE 8b
FIGURE 8a

TRUE ONE PIECE HOUSING FIBER OPTIC ADAPTER

B. CROSS-REFERENCE TO RELATED APPLICATION

This application is a continuation-in-part of U.S. patent application Ser. No. 13/113,635, filed May 23, 2011.

C.-E. NOT APPLICABLE

F. BACKGROUND

The present disclosure relates to an adapter or a coupling for holding two fiber optic connectors in alignment. More specifically, the present disclosure relates to an adapter or coupling having a one piece, unibody housing.

Recently, the use of fiber optics for communications purposes has grown immensely. Data, voice, and other communication networks are increasingly using fiber optics to carry information. An optical fiber is generally a glass fiber configured to carry light. Individual fibers may be grouped into a line capable of carrying large amounts of data simultaneously.

When constructing a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit without interruption. A typical connector includes two symmetrical housings, each housing having a connector latch. An alignment sleeve is placed within the connector latches to ensure the fibers are properly aligned. Then, the two housings are welded (i.e., via ultrasonic welding), riveted, or otherwise attached to each other, thereby forming a coupling. Individual optic fibers are then places within each connector latch, the alignment sleeve aligning the fibers.

This exemplary coupling is expensive to produce as numerous parts are required (each of which may require separate manufacturing), and a welding, riveting or other attachment process must be done to connect the two symmetrical housings. Additionally, alignment issues may result from the attachment process as the two symmetrical housing components may shift during welding.

One approach to reduce the amount of components required is shown in U.S. Pat. No. 5,317,663 (the '663 patent), issued May 31, 1994 to Beard et al, the contents of which are incorporated herein by reference. In the '663 patent, an adapter is taught which includes a single piece housing in which both connector latches are placed, along with n alignment sleeve, to provide an adapter. However, to place the components within the housing, a window is provided in the housing. A housing cover is provided which is welded to the housing to cover the window. While the design of the '663 patent may eliminate any issues with alignment resulting from the attachment of the two housing components, it still requires numerous components and multiple assembly steps including welding the housing cover over the window.

The adapters are mountable in openings in a panel, and the opening will typically have some variance in size. Panels with smaller openings create a tighter fit for the inserted adapter. Conversely, larger openings can yield a loose fit and allow the adapter the freedom to wiggle, as there will be play between the adapter and the sides of the opening. Although it is a benefit to control the play, or freedom to wiggle during seismic events, another goal for controlling, limiting or eliminating play is quality perception where a loose fit of a housing in an opening may not be viewed as being of the same quality as tight fitting parts. Adapter configurations with housings that minimize, or eliminate play are therefore more desirable.

G. SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a fiber optic adapter. The fiber optic adapter includes a one piece housing, a dual connector latch, and an alignment sleeve. The one piece housing includes a first alignment cylinder configured to receive a first optic fiber and at least one snap receiving recess. The dual connector latch includes a second alignment cylinder configured to receive a second optic fiber and at least one snap feature configured to engage within the snap receiving recess such that the connector latch locks within the housing. The alignment sleeve is configured to be placed within the first alignment cylinder and the second alignment cylinder such that the alignment sleeve is positioned prior to the dual connector latch being locked into the housing.

In another general respect, the embodiments disclose an alternative fiber optic adapter. The fiber optic adapter includes a one piece housing comprising a first alignment cylinder configured to receive a first optic fiber, a dual connector latch comprising a second alignment cylinder configured to receive a second optic fiber, and an alignment sleeve configured to be placed within the first alignment cylinder and the second alignment cylinder, wherein the alignment sleeve is positioned prior to the dual connector latch being locked into the housing.

In another general respect, the embodiments disclose a fiber optic adapter configured to be mounted in an opening in a mounting panel, wherein the adapter includes a one-piece housing having at least one resilient member configured for engaging with the panel to reduce play in a first direction and at least one resilient member configured for engaging with the panel to reduce play in a second direction at an angle to the first direction.

In another general respect, the embodiments disclose a fiber optic adapter configured to be mounted through an opening in a panel, the opening having at least a first pair of opposite sides defining a first cross-sectional dimension, and a second pair of opposite sides defining a second cross-sectional dimension, the second cross-sectional dimension being at an angle to the first cross-sectional dimension, and the adaptor includes a one piece housing defining a longitudinal dimension and having an external surface defining an external shape configured to fit into the panel opening. The one-piece housing includes at least one resilient latching member extending from the external surface of the housing and configured for engaging the panel to latch the housing to the panel and eliminate play between the housing and the first pair of opposite sides, and at least one resilient member extending from the housing and configured for engaging the panel to eliminate play between housing and the second pair of opposite sides.

H. BRIEF DESCRIPTION OF THE DRAWINGS

FIG. 8a illustrates an additional cross-sectional view of a fiber optic adapter taken along line VIII-VIII in FIG. 6, but also installed in a panel opening according to an embodiment.

FIG. 8b illustrates a detailed cross-sectional view of a latch of a fiber optic adapter during insertion of the adapter into a panel opening according to an embodiment.

I. DETAILED DESCRIPTION

Figure 1:
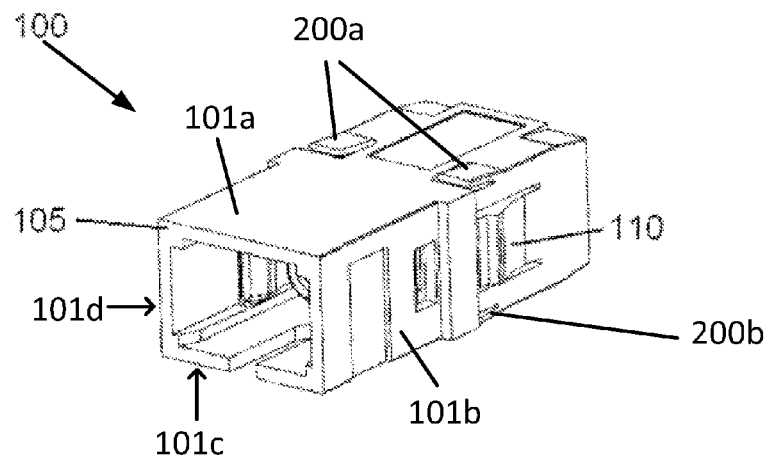
FIG. 1 illustrates an exemplary fiber optic adapter including a one piece housing according to an embodiment.

FIG. 1 illustrates an exemplary fiber optic connector or adapter 100 including a one piece housing 105. The housing 105 may be made from a plastic or polymer via various manufacturing methods. For example, the housing 105 may be made from an injection molded polymer. The housing 105 may include various external features such as one or more integral bulkhead latches 110 for latching the housing (and thus the adapter 100) to a panel or to another device such as the input port on a network router.

Figure 2:
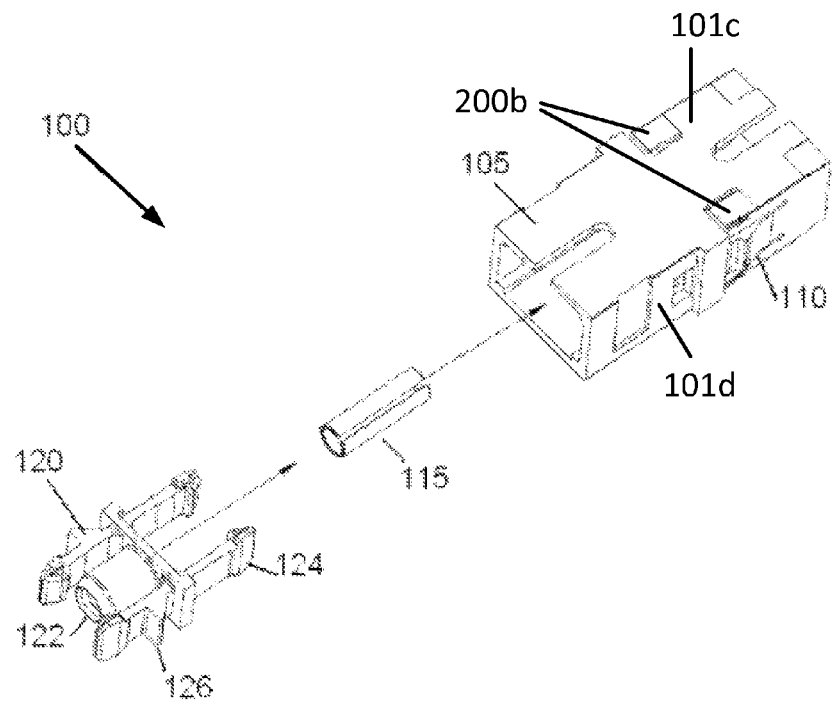
FIG. 2 illustrates an exploded view of the fiber optic adapter of FIG. 1.

FIG. 2 illustrates an exploded view of adapter 100. In this exemplary embodiment, the adapter 100 includes three major components: (1) the single piece housing 105, (2) an alignment sleeve 115, and (3) a dual connector latch 120. The dual connector latch may include several components such as an alignment cylinder 122 for receiving a first topic fiber, retaining clips 124 configured to frictionally hold or engage a fiber optic tip enclosure, and one or more snap features 126. As shown in FIG. 2, two sets of retaining clips 124 are integrated into the dual connector latch 120, a first set for engaging a first optic fiber and a second set for engaging a second optic fiber. An optic fiber is typically terminated in a grip housing including notches for engaging with the retaining clips 124. Within each grip housing is an end of the optic fiber including a ferrule and a ferrule holder. However, manufacture of optic fibers, including terminations and associated housings is well known in the art and will not be discussed in additional detail. As also shown in FIG. 2, the snap features 126 are small, integral protrusions positioned and shaped to frictional hold or engage one or more snap receiving recesses within the housing 105. Similar to the housing 105, the dual connector latch 120 may be manufactured as a single injection molded component.

Figure 3A:
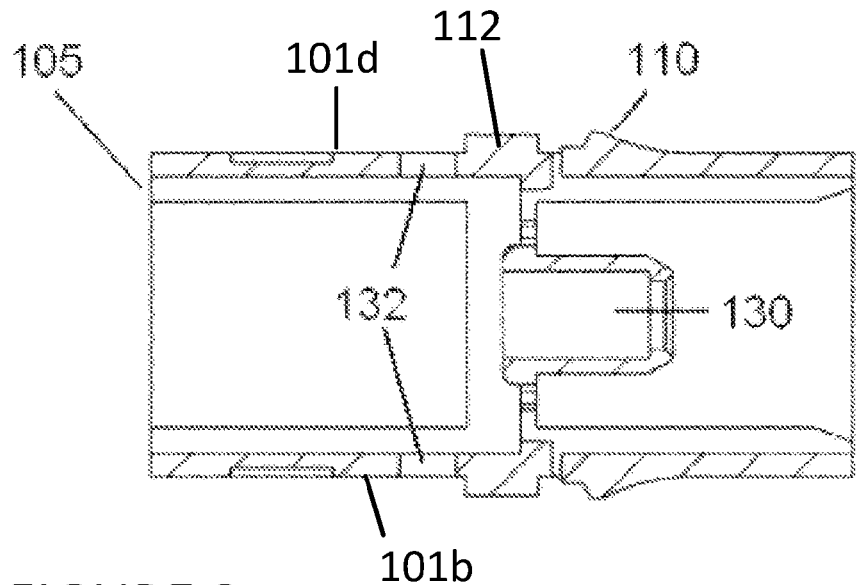
FIG. 3a illustrates a cross-sectional view of the one piece housing of FIG. 1.

FIG. 3a illustrates a cross-sectional view of the housing 105. The housing 105 may include several features such as an integral alignment cylinder 130 (similar to alignment cylinder 122 of the dual connector latch 120) configured to frictionally hold an optic fiber. The integral alignment cylinder 130 may be formed along with the housing 105 during a single injection molding process. The housing 105 may also include one or more snap receiving recesses 132. The snap receiving recesses 132 may be positioned and sized to accept the snap features 126 of the dual connector latch 120. In this example, the snap receiving recesses 132 are indentations in the sidewall of the housing 105 such that, when pushed into the housing, the snap features 126 of the dual connector latch 120 grab against the receiving recesses, thereby locking the dual connector latch into the housing.

Figure 3B:
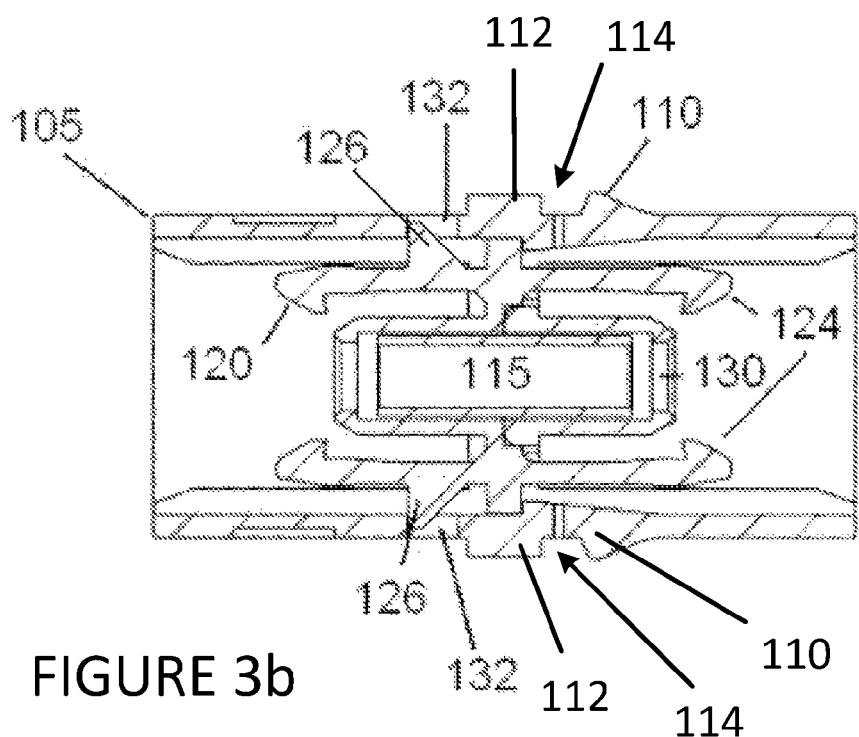
FIG. 3b illustrates a cross-sectional view of the fiber optic adapter of FIG. 1.

FIG. 3b illustrates a cross sectional view of adapter 100 after the alignment sleeve 115 and the dual connector latch 120 have been assembled within the housing 105. As shown in FIG. 3b, the snap features 126 of the dual connector latch 120 are positioned within the snap receiving recess 132, thereby locking the dual connector latch within the housing. Similarly, a set of retaining clips 124 of the dual connecting latch 120 are positioned about the integral alignment cylinder 130 such that any optic fiber placed into the integral alignment cylinder will be held in place by the retaining clips.

Referring again to FIG. 2, to assemble the adapter 100, the alignment sleeve 115 is positioned such that it is aligned with both the alignment cylinder 122 of the dual connector latch 120, as well as the alignment cylinder 130 of the housing 105. After aligning, the dual connector latch 120 is placed within the housing 105 and a force is applied on the dual connector latch until the snap feature 126 locks into the snap receiving recess 132 of the housing. Once the snap feature 126 is locked, assembly of the adapter 100 is complete. In this configuration, only 3 components are required and no assembly techniques beyond the application of a pushing force is required.

The one piece adapter housing as taught herein eliminates the need to ultrasonically weld the components together as is required by the prior art. This reduces the cost of manufacturing and assembling additional components. Additionally, depending on the design of the snap features and associated snap receiving recesses, the adapter may be disassembled to replace a worn part (e.g., if a retaining clip on the dual latch connector breaks) or otherwise repair the adapter. This feature would not be possible in the prior art as the adapters are permanently welded into a solid piece.

The various components described above may be constructed by manufacturing methods well know in the art. Materials for use in construction of the various components listed above may include various polymers, plastics, metals, glass, and other similar suitable materials. For example, the housing 105 may be manufactured via an plastic injection molding process. Alternatively, the housing 105 may be manufactured from a suitable metal via a milling process. Additional materials and manufacturing methods will be well known to those skilled in the art.

As shown in FIG. 1, the one-piece housing 105 of the fiber optic connector or adapter 100 may include various external features, such as integral bulkhead latches 110, and integral projecting flanges, or wings 200a and 200b. As shown in more detail in FIGS. 4 and 5, the latches 110 and wings 200a, 200b may be integrally molded or formed with the housing 105. Latches 110 and wings 200a, 200b may be provided for adapters 100 that are configured for being installed in a panel 300 as shown in FIG. 6.

Figure 4:
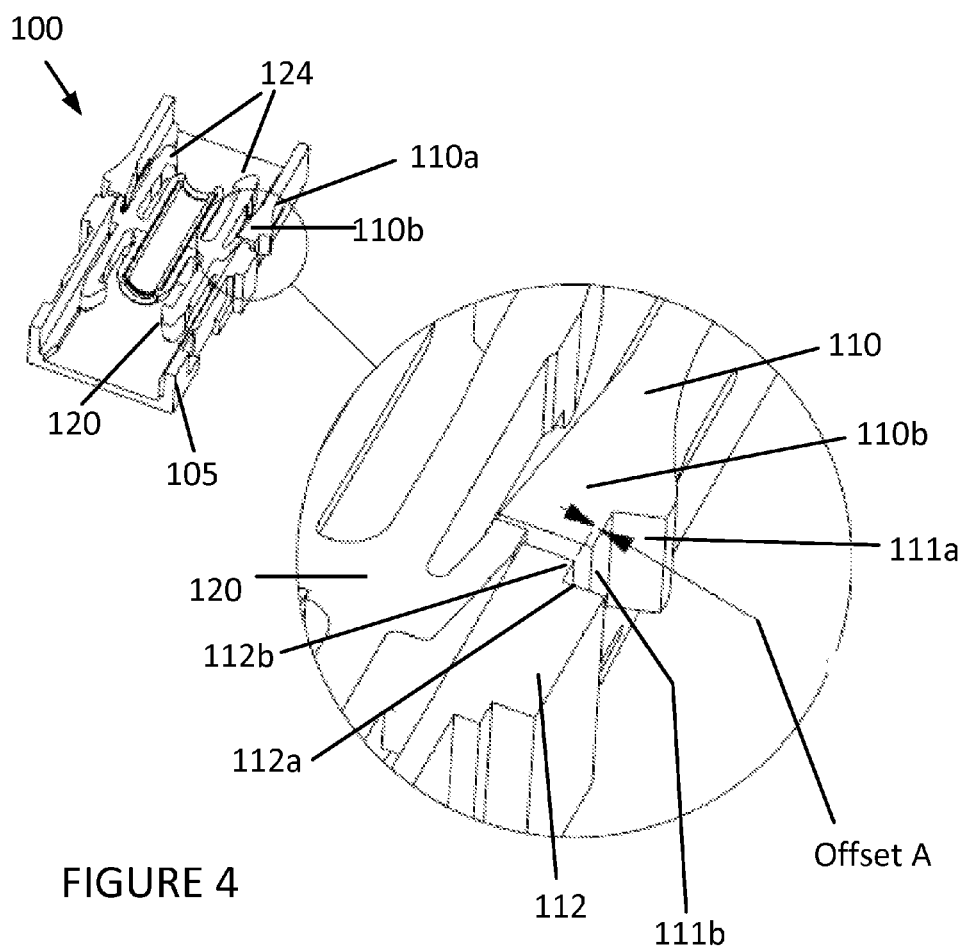
FIG. 4 illustrates a detailed cross-sectional view of a latch of a fiber optic adapter according to an embodiment.

As shown in FIGS. 1-3, latches 110 may be provided on opposite sides 101b and 101d of the housing 105. In an embodiment, an adapter 100 may have only one latch 110 on one side thereof which may be sufficient for retaining an adapter in a panel opening 310 (FIG. 6). FIGS. 3b and 4 show cross-sectional details of a latch 110 in an un-installed, or base configuration of the housing 105. Each latch 110 may have a first end 110a that is integral with the housing body and a second end 110b spaced apart from the first end and movable, radially inwardly or radially outwardly with respect to the housing body. End 110b may include a notched end defined by surfaces 111a and 111b which, together with a stop 112 and stop surfaces 112a and 112b, may form a receiving groove 114 configured for receiving a wall of the panel 300 therein as shown in FIGS. 8a and 8b. In the base configuration, the surface 111b may be offset externally outwardly from the surface 112b by a distance as shown as offset (A) in FIG. 4.

The function and operation of latches 110 are shown in FIG. 8b. FIG. 8b provides four consecutive diagrams illustrating movement of a housing 105 in a direction of arrow 320 past a wall of a housing 300. The representations of FIG. 8b show a detail of one side of an adapter 100, such as that of FIGS. 1-3, and it should be understood that the same will also generally be occurring on the opposite side as well. As shown in FIG. 6, the housing may have a shape which allows for the housing to be inserted into an opening in a panel 300. FIG. 8b-(I) shows housing 105 within the opening in panel 300 as latch end 110b approaches the wall of the panel 300. Upon further movement into the opening, as shown in FIG. 8b-(II), the latch end 110b will engage the wall 300. Upon further movement of the housing in the direction of arrow 320, the end 110b will be depressed inwardly by the wall 300 as shown in FIG. 8b-(III), to allow movement of the housing into the opening of the wall. Because of the resiliency of the material of the housing 105, end 110b will have a tendency to return to its base configuration (FIG. 3) and will thereby exert a biasing force, represented by arrow 330, onto the edge of panel wall 300. An additional movement of the housing in the direction of arrow 320 will move wall 300 into the receiving groove 114 so that the wall 300 abuts the surface 112a of stop 112, whereby end 110b of the latch will return towards its base configuration as shown in FIG. 8b-(IV) to latch the panel wall within the groove. However, due to the offset (A) shown in FIG. 4, end 110b may not return fully to its base configuration so that there remains at least a partial force 330 acting on the wall 300.

By providing such latches 110 on each side of housing 105 (sides 101b and 101d in FIG. 1, the housing 105 may be securely retained in a panel opening 310. In a typical installation, the opening 310 in the panel 300 may be slightly larger than the width of a housing 105 to allow for some tolerance in production of the housings and panels, and allow for easier insertion of the housing into the panel openings. This may, therefore, lead to small gaps between the housing 105 and panel walls 300 and allow for play therebetween. By dimensioning the housing 105 and the panel opening in such a way that the opening dimension is greater than a housing dimension defined between the surface 112b on one side of the housing and the surface 112b on the opposing side of the housing, and is less than a housing dimension defined between the surface 111b on one side of the housing and the surface 111b on the opposing side of the housing, a force 330 may remain exerted on each side of the opening by the latches 110 to thereby reduce, or eliminate play between the sides 101b and 101d of the housing and the walls of the panel 300.

Figure 9A:
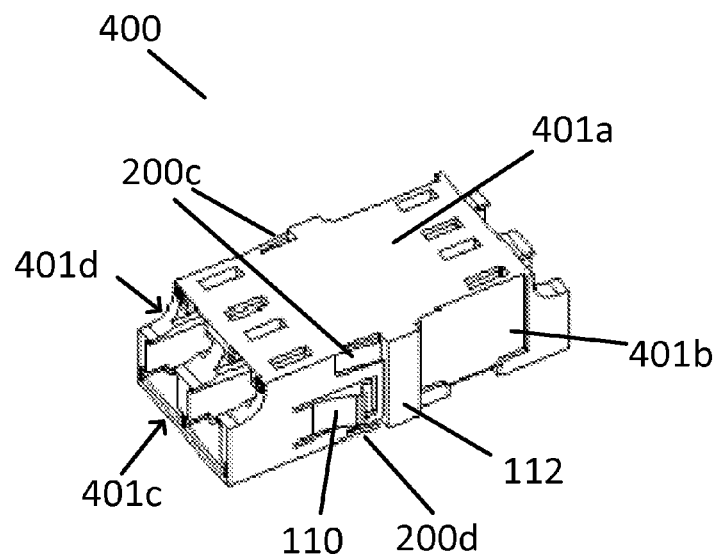
FIG. 9a illustrates a perspective view of a duplex adapter according to an embodiment.
Figure 9B:
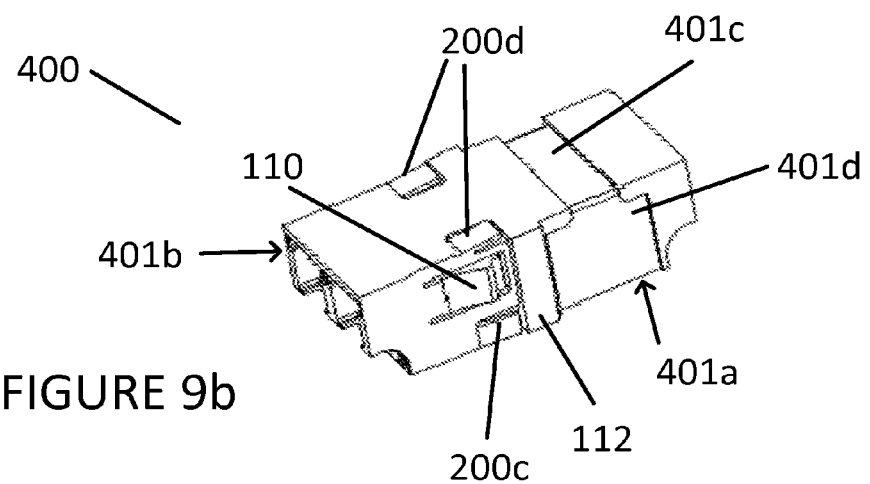
FIG. 9b illustrates an alternative perspective view of a duplex adapter according to an embodiment.

In an embodiment, as shown in FIG. 1, with latches 110 on sides 101b and 101d, the latches may eliminate play between the panel 300 and sides 101b and 101d, but may not reduce play that may exist between the remaining two sides 101a and 101c and the sides of the panel openings. Additional latches 110 may also be included on the sides 101b and 101d for reducing, or eliminating play at these sides. However, since depression of the latches inwardly is needed for removal, such a configuration would complicate removal as four latches would require essentially simultaneous depression for release. Additional spacing above and below a mounted adapter would also be needed for access to the latches for release thereof. Therefore, to eliminate play between the sides 101b and 101d and the sides of the opening in the panel, wing tabs 200a and 200b may be provided. In an embodiment, such wings may be provided on only one side 101b or 101d as shown in FIGS. 9a and 9b, and in a further embodiment, at least one such wing may be provided on a side.

Figure 5:
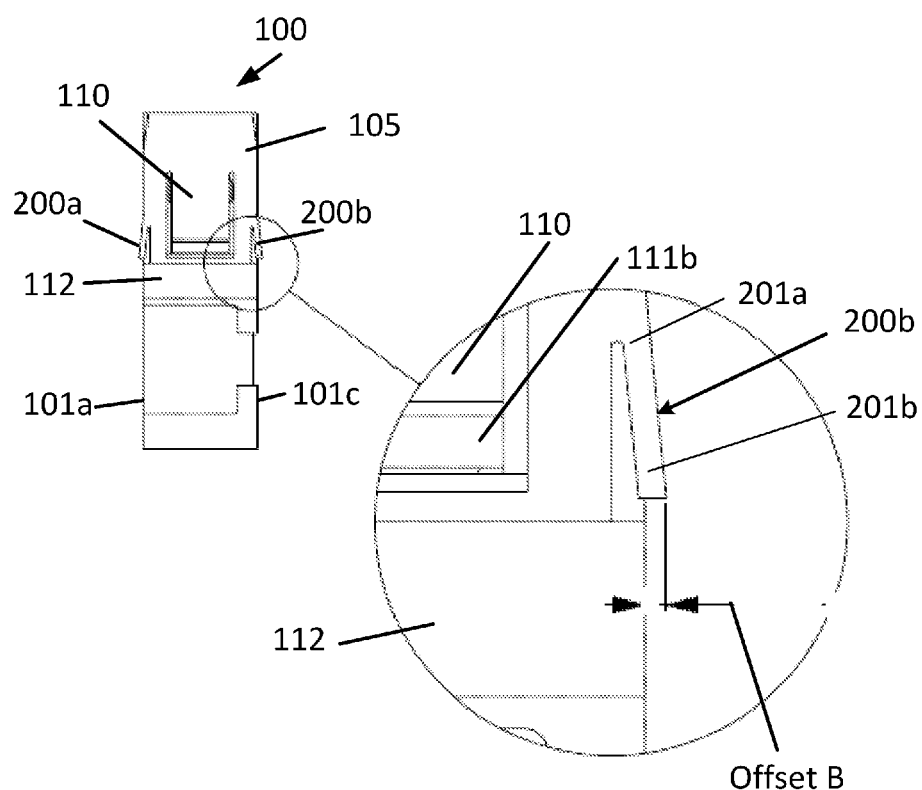
FIG. 5 illustrates a detailed cross-sectional view of a wing of a fiber optic adapter according to an embodiment.
Figure 6:
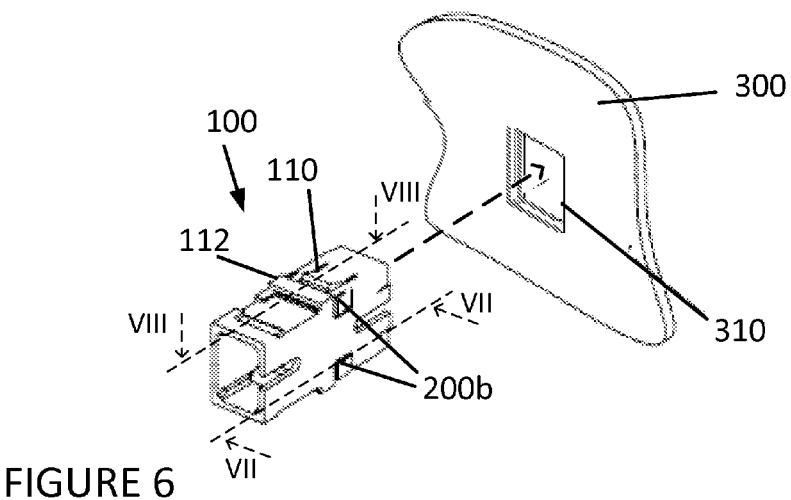
FIG. 6 illustrates the insertion of a fiber optic adapter into a panel opening according to an embodiment.

As shown in FIGS. 1, 2 and 5, wings 200a and 200b may be respectfully provided on opposite sides 101a and 101c of the housing 105, and may be configured as resilient flanges extending from the housing. The flanges may extend at an angle to the housing in a direction away from a direction of insertion of the housing into the opening. FIG. 5 shows details of a wing 200b in an un-installed, or base configuration of the housing 105, and it should be understood that any discussion pertaining to one wing may apply to any additional wings as well. As shown in the detail view, each wing 200b may have a first end 201a that is integral with the housing body and a second end 201b spaced apart from the first end in a direction opposite to an insertion direction for mounting the adapters in a panel. Each wing may be movable, inwardly or outwardly with respect to the housing body 105. Each wing may have an external surface 202, that in the base configuration, may extend externally outwardly from the housing 105 by a distance as shown as offset (B) in FIG. 5.

Figure 7A:
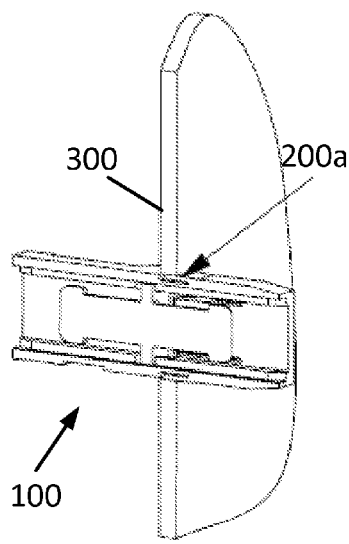
FIG. 7a illustrates a cross-sectional view of a fiber optic adapter taken along line VII-VII in FIG. 6, but also installed in a panel opening according to an embodiment.
Figure 7B:
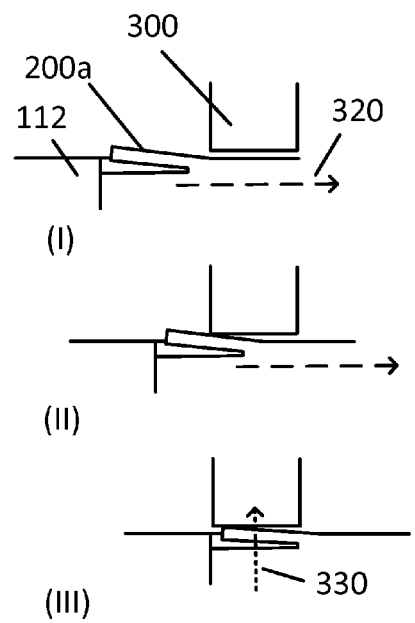
FIG. 7b illustrates a detailed cross-sectional view of a wing of a fiber optic adapter during insertion of the adapter into a panel opening according to an embodiment.

The function and operation of wings 200a and 200b are shown in FIG. 7b. FIG. 7b provides three consecutive diagrams illustrating movement of a housing 105 in a direction of arrow 320 past a wall of a housing 300. FIG. 7b-(I) shows housing 105 within the opening in panel 300 as wing 200a approaches the wall of the panel 300. Upon further movement into the opening, as shown in FIG. 7b-(II), the wing 200a will engage the wall 300. Upon further movement of the housing in the direction of arrow 320, the wing 200a will be depressed inwardly by the wall 300 as shown in FIG. 7b-(III). Because of the resiliency of the material of the housing 105, wing 200a will have a tendency to return to its base configuration (FIG. 3) and will thereby exert a biasing force, represented by arrow 330, onto the edge of panel wall 300.

By providing such wings 200a, 200b on sides of housing 105 (for example, sides 101a and 101c in FIG. 1), a force 330 may be exerted on each side of the opening to thereby reduce, or eliminate play between the sides 101a and 101c of the housing and the walls of the panel 300. When inserted in an appropriately sized opening, the wings 200a, 200b may always be pushing against the edges of the opening of the mounting panel to control the movement within the opening.

As shown in FIGS. 1 and 2, for a rectangular adapter, wings 200a, 200b may be located on the top and bottom (101a and 101c) respectively, and the latches 110 may be located on the sides (101b and 101d). In general, the designation and use of top, bottom and sides, is relative, and provides only general reference directions, and the illustrations could be depicted in alternate views with the top, bottom and side designations interchanged.

FIGS. 9a and 9b show an alternative configuration for an arrangement of latches 110 and wings 200c, 200d on a duplex adapter 400. In this configuration, latches 110 are provided on the sides 401b and 401d. The latches are, however, offset towards the bottom 401c, and wings 200c are positioned adjacent the top 401a. The combination of wings 200c and latches 110 may reduce or eliminate play between the sides 401b, 401d and the walls of a panel 300 when the duplex adapter is disposed in a panel opening. Side 401a of the duplex adapter 400 may be devoid of wings, and the anti-play wings 200d may be provided on the opposite side 401c, where the wings will press the side 401a into engagement with the sides of a panel opening and reduce or eliminate play between the sides 401a, 401c and the walls of a panel 300 when the duplex adapter is disposed in a panel opening. In an embodiment, the wings on each side may be disposed as far from one another as possible, or adjacent the edges. By providing a pair of spaced apart wings, or a pairing of a wing and a latch, near or adjacent the edges of the sides, less wobble, or play in an adapter may be achieved than by providing a single such latch or wing towards the center of each side. As shown by the variations in the drawings provided, the number and location of wings may be changed as required for a particular adapter type.

The above examples are not intended to limit the invention, but merely to serve as an illustration of how the invention might be constructed and operated.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A fiber optic adapter configured to be mounted in an opening in a mounting panel, the panel having a perimetrical surface about the opening for being disposed adjacent the adapter with potential play between the perimetrical surface and the adapter when the adapter is mounted within the opening, and the adapter comprising:
   at least one first resilient member configured for laterally engaging with the perimetrical surface in a first direction to reduce potential play in the first direction when the adapter is mounted in the opening, and
   at least one second resilient member configured for laterally engaging with the perimetrical surface in a second direction to reduce potential play in the second direction when mounted in the opening, with the second direction being transverse to the first direction.

2. The adapter of claim 1, wherein:
   the adapter has a first end, and a second end spaced apart from the first end, and defines a longitudinal axis through the first and second ends;
   at least one of the first end and the second end is configured for being inserted into the opening of the mounting panel in an insertion direction parallel to the longitudinal axis; and
   the first and second directions are orthogonal to the longitudinal axis.

3. The adapter of claim 2, wherein:
   the opening in the mounting panel is defined by at least first and second pairs of opposite edges of a panel wall with the first and second pairs of opposite edges forming at least a portion of the perimetrical surface about the opening, and the opening has a first cross-sectional configuration; and
   the adapter has an exterior surface and defines a second cross-sectional configuration orthogonal to the longitudinal axis, wherein the second cross-sectional configuration of the adapter is configured to fit within the first cross-sectional configuration of the opening with play between the exterior surface of the adapter and the perimetrical surface formed by the first and second pairs of opposite edges of the opening.

4. The adapter of claim 3, wherein:
   the first cross-sectional configuration of the opening is rectangular with the first and second pairs of opposite edges forming the rectangular opening;
   the second cross-sectional configuration of the adapter is rectangular;
   the adapter comprises a one-piece housing comprising first and second pairs of opposing side walls defining the exterior surface;
   at least one side wall of the first pair of opposing side walls comprises the at least one first resilient member; and
   at least one side wall of the second pair of opposing side walls comprises the at least one second resilient member.

5. A fiber optic adapter configured to be mounted in an opening in a mounting panel, wherein the opening is rectangular and defined by first and second pairs of opposite edges of a panel wall, the opening defines a first cross-sectional dimension between the first pair of opposite edges, and a second cross-sectional dimension between the second pair of opposite edges, and the adapter comprises:
   a first end, and a second end spaced apart from the first end, and defining a longitudinal axis through the first and second ends, wherein at least one of the first end and the second end is configured for being inserted into the opening of the mounting panel in an insertion direction parallel to the longitudinal axis;
   first and second pairs of opposing side walls defining an exterior surface, wherein the side walls define a rectangular cross-sectional configuration orthogonal to the longitudinal axis, and the adapter fits within the opening with the first pair of opposing side walls adjacent the first pair of opposite edges of the opening, and the second pair of opposing side walls adjacent the second pair of opposite edges of the opening with play between the side walls and the adjacent edges of the opening;
   the adapter defines a third cross-sectional dimension between the first pair of opposing side walls, and a fourth cross-sectional dimension between the second pair of opposing side walls, wherein the third cross-sectional dimension is less than the first cross-sectional dimension and the fourth cross-sectional dimension is less than the second cross-sectional dimension;
   at least one side wall of the first pair of opposing side walls comprises at least one first resilient member configured for engaging with the panel wall to reduce play in a first direction orthogonal to the longitudinal axis when mounted in the opening; and
   at least one side wall of the second pair of opposing side walls comprises at least one second resilient member configured for engaging with the panel wall to reduce play in a second direction orthogonal to the longitudinal axis when mounted in the opening, with the second direction being transverse to the first direction.

6. The adapter of claim 5, wherein:
the adapter is formed as a one-piece housing;
the at least one first resilient member comprises at least one first resilient flange having a first end integral with the one-piece housing and a second end disposed away from the at least one side wall of the first pair of opposing side walls, the second end is disposed a first distance from the at least one side wall, and the first distance plus the third cross-sectional dimension is greater than the first cross-sectional dimension; and
the at least one second resilient member comprises at least one second resilient flange having a first end integral with the one-piece housing and a second end disposed away from the at least one side wall of the second pair of opposing side walls, the second end is disposed a second distance from the at least one side wall, and the second distance plus the fourth cross-sectional dimension is greater than the second cross-sectional dimension.

7. The adapter of claim 6, wherein:
each of the at least one first resilient flange and the at least one second resilient flange is configured to be depressed inwardly by a corresponding adjacent edge of the opening upon insertion of the one-piece housing into the opening in the insertion direction; and
each of the at least one first resilient flange and the at least one second resilient flange is configured to apply an outward biasing force to the corresponding edge upon being depressed inwardly.

8. The adapter of claim 7, wherein:
each side wall of the first pair of opposing side walls comprises at least one first resilient flange; and
each side wall of the second pair of opposing side walls comprises at least one second resilient flange.

9. The adapter of claim 8, wherein each side wall of the first pair of opposing side walls comprises one first resilient flange, and each first resilient flange comprises a resilient latching member configured to engage the corresponding adjacent edge of the opening to latch the one-piece housing to the panel.

10. The adapter of claim 8, wherein each side wall of the second pair of opposing side walls has a first edge disposed adjacent a side wall of the first pair of opposing side walls, and a second edge disposed adjacent the other of the side walls of the first pair of opposing side walls, and each side wall of the second pair of opposing side walls comprises two second resilient flanges with each of the two second resilient flanges being disposed spaced apart from one another towards the first and second edges.

11. The adapter of claim 10, wherein each of the two second resilient flanges are disposed adjacent one of the first and second edges.

12. The adapter of claim 11, wherein:
each side wall of the first pair of opposing side walls comprises one first resilient flange, and each first resilient flange comprises a resilient latching member configured to engage the corresponding adjacent edge of the opening to latch the one-piece housing to the panel;
the one piece housing additionally comprises:
a first alignment cylinder integral with the housing and configured to receive a first optic fiber, and
at least one snap receiving recess; and
the adapter further comprises:
a dual connector latch comprising:
a second alignment cylinder configured to receive a second optic fiber, and
at least one snap feature configured to engage within the snap receiving recess such that the connector latch locks within the housing; and
an alignment sleeve configured to be placed within the first alignment cylinder and the second alignment cylinder, wherein the alignment sleeve is positioned prior to the dual connector latch being locked into the housing.

13. A fiber optic adapter configured to be mounted through an opening in a panel, the opening having at least a first pair of opposite sides defining a first cross-sectional dimension, and a second pair of opposite sides defining a second cross-sectional dimension, with the first and second pairs of opposite sides defining a perimetrical surface about the opening, and the second cross-sectional dimension being transverse to the first cross-sectional dimension, and the adaptor comprising:
a one piece housing defining a longitudinal dimension and having an external surface defining an external shape configured to fit into the panel opening with potential play between the external surface and the perimetrical surface, the housing comprising:
at least one resilient latching member extending from the external surface of the housing and configured for engaging the panel to latch the housing to the panel and eliminate play between the external surface of the housing and the perimetrical surfaces of the first pair of opposite sides in a first lateral direction; and
at least one second resilient member extending from the housing and configured for engaging the panel to eliminate play between the external surface of the housing and the perimetrical surfaces of the second pair of opposite sides in a second lateral direction, wherein the second lateral direction is transverse to the first lateral direction.

14. The adapter of claim 13, wherein the opening is rectangular and the housing further comprises:
a first pair of opposite sides for being disposed adjacent corresponding perimetrical surfaces of the sides of the first pair of opposites sides of the opening, and at least one side of the first pair of opposite sides of the housing comprises the at least one resilient latching member;
a second pair of opposite sides for being disposed adjacent corresponding perimetrical surfaces of the sides of the second pair of opposites sides of the opening, and at least one side of the second pair of opposite sides of the housing comprises the at least one second resilient member; and
the first pair of opposite sides is disposed orthogonally to the second pair of opposite sides to define an external rectangular shape corresponding to the rectangular opening and the second lateral direction is orthogonal to the first lateral direction.

15. The adapter of claim 14, wherein:
the one-piece housing has an insertion direction for being inserted into the opening;
the at least one resilient member comprises at least one resilient flange having a first end integral with the one-piece housing and extending angularly away from the one-piece housing in a direction opposite the insertion direction to a second end disposed away from the at least one side of the second pair of opposite sides;
the at least one resilient flange is configured to be depressed inwardly by a corresponding adjacent side of the opening upon insertion of the one-piece housing into the opening in the insertion direction; and the at least one second resilient flange is configured to apply an outward biasing force to the corresponding adjacent perimetrical surface upon being depressed inwardly.

16. The adapter of claim 1, wherein:

the at least one first resilient member is configured for laterally engaging with the perimetrical surface in the first direction to eliminate any play in the first direction when the adapter is mounted in the opening, and the at least one second resilient member is configured for laterally engaging with the perimetrical surface in the second direction to eliminate any play in the second direction when mounted in the opening.

* * * * *